Patented Apr. 18, 1939

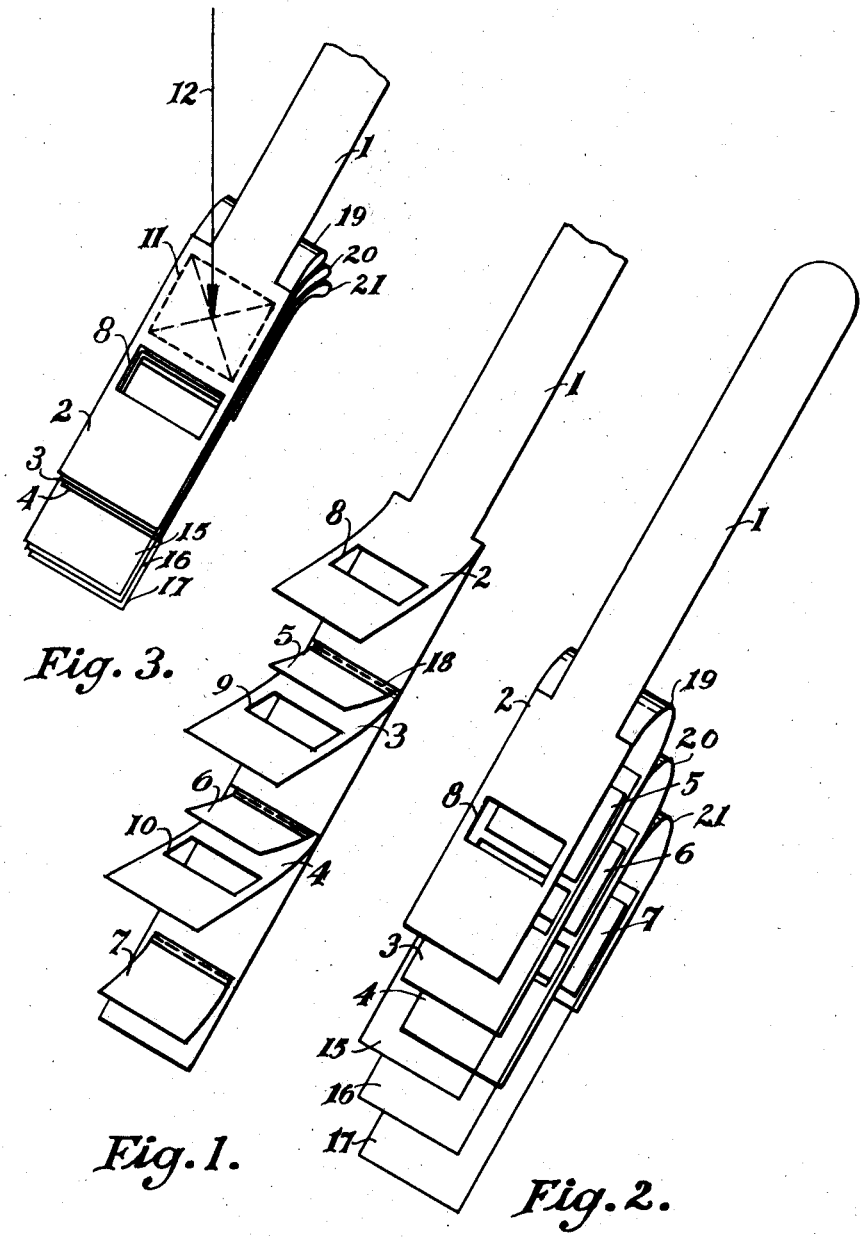

2,155,078

UNITED STATES PATENT OFFICE 2,155,078

FILM PACK FOR COLOR PHOTOGRAPHY

Raymond G. Brown, Columbus, Ohio

Application January 23, 1937, Serial No. 121,957

6 Claims. (Cl. 95—2)

In photography, color separation may be effected by making three negatives through appropriate light filters. This process requires that either three separate exposures be made or that three exposures be made simultaneously.

The law of conservation of energy teaches that regardless of the method used to make the three separation negatives, and regardless of whether the three are made simultaneously or separately, the minimum exposure will be the sum of the exposures required for each of the separate negatives.

In the improvement of this art it is desirable to produce the three separation negatives in the minimum time, and by an inexpensive and flexible device.

Flexibility is desirable in the improvement of this art, since in order to produce effective results, true color values are not always required, certain ones being intensified others subdued.

Lighting conditions require a variation in color filters either for the production of true color effects or unusual or exaggerated effects as desired by the operator.

Thus it is desirable to use a variety of color filters and this requires the modification of relative exposures.

This invention provides a device for making a series of exposures consecutively without appreciable loss of time between exposures, by a single uniform movement, without the use of expensive prisms, mirrors, reflecting surfaces or moving mechanical parts and permitting the time of the individual exposures to be varied and the use of various sets of light filters.

These objects are accomplished by means of a film pack of novel construction embodying within the pack, a series of focal plane shutters formed by the trailing papers of the pack as it unfolds when the tab is pulled out.

The distribution of the time of exposure in varying amounts to each of the series of light sensitive surfaces is effected by varying the width of the slots in the trailing papers of the pack. Thus packs may be made up for various kinds of light, for films of various sensitivity and for various series of color filters and in this way providing great flexibility at low cost.

Other objects will appear from the following description, the novel features being pointed out in claims at the end thereof.

In the drawing now referred to, like reference characters denote like parts throughout.

Figure 1 is an isometric view of the device, unfolded, lying flat and showing in this embodiment a series of three light sensitive surfaces on films together with the three trailing papers for exposing and covering these surfaces.

Figure 2 is an isometric view of the device folded loosely so that the relation of the various parts may be seen.

Figure 3 is an isometric view showing the device folded and compressed as it would be in a suitable holder, not a part of this invention, ready for exposure.

In Figure 1, 1 is the support strip made of paper or other suitable fabric.

2, 3 and 4 represent trailing papers, having slotted openings or apertures; 8, 9 and 10.

5, 6 and 7 are three light sensitive films held in position by gummed strips, 18.

In Figure 2, the support strip has been loosely folded, there being three loops; 19, 20 and 21. Between the trailing papers 2, 3 and 4 are interposed transparent membranes 15, 16, and 17 which may be appropriately stained as light filters or clear as desired.

In Figure 3, the support strip is shown folded and compressed as in a suitable holder not a part of this invention. 12 represents the focal axis of the camera lens and 11 represents the area of the picture plane in the camera.

In operation, the pack, having been folded as in Figure 3, is placed in a light tight holder, not a part of this invention and the holder and pack inserted in any camera so that the rectangle 11 in Figure 3 occupies the picture plane.

The camera having been positioned and lens opened, the paper tab 1, Figure 3, is drawn out at a uniform speed, manually or by a suitable mechanism.

As the tab 1 is withdrawn, the trailing paper 2, moves over film 5 sliding on membrane 15 without disturbing the film. Aperture 8 exposes the film which is then covered by the end of trailing paper 2. At this time, loop 19 has been taken up and the covered and exposed film is drawn out of the pack and trailing paper 3 having aperture 9 exposes film 6 which is covered, drawn off and trailing paper 4 with aperture 10 exposes and covers film 7 which is drawn off in turn completing the operation.

Membranes 15, 16 and 17 prevent motion of the film being exposed until the exposure has been completed.

Take up loops 19, 20 and 21 are made of proper length so that each film is drawn out of the pack as soon as fully exposed and covered.

Membranes 15, 16 and 17 are intended ordinarily to be transparent and colorless, the color separation being effected by the individually stained and selectively sensitive films which may be made so by the nature of the emulsion, the staining thereof or the staining of the backs thereof and mounting with sensitive surface back of the stained surface or by the attachment of a thin stained membrane in front thereof.

I claim:

1. Loading material for a photographic film pack comprising; an unfolded completely extended elongated backing strip having a pull-out tab formed at one end thereof, a plurality of focal plane shutter curtain members, each including a forward opaque portion and a rearward opaque portion separated by an exposure aperture, each of said members being attached by its forward edge to the backing strip, the attachment being such that the forward end of each member is nearer to the tab end of the backing strip, the members being arranged with relation to each other so that the rearward opaque portion of each member covers the forward opaque portion of each succeeding member, and light sensitive films overlying the forward opaque portions of each member except that closest to the tab, and a light sensitive film attached to the backing strip so that it lies under the rearward opaque portion of the member farthest from the tab.

2. Loading material for a photographic film pack comprising, when unfolded and completely extended, an elongated backing strip having a pullout tab formed at one end thereof, a plurality of focal plane shutter curtain members, each being apertured to effect an exposure, between a forward and a rearward opaque portion, each of said members being attached by its forward edge to the backing strip, the attachment being such that the forward end of each member is nearer to the tab end of the backing strip, the members being arranged with relation to each other so that the rearward opaque portion of each member covers the forward opaque portion of the succeeding member and a light-sensitive film overlying the forward opaque portion of each member except that closest to the tab and a light-sensitive film attached to the backing strip so that it lies under the rearward opaque portion of the member farthest from the tab.

3. Loading material for a photographic film pack comprising, when unfolded and completely extended, an elongated backing strip having a pullout tab formed at one end thereof, a plurality of focal plane shutter curtain members, each being apertured to effect an exposure, between a forward and a rearward opaque portion, each of said members being attached by its forward edge to the backing strip, the attachment being such that the forward end of each member is nearer to the tab end of the backing strip, the members being arranged with relation to each other so that the rearward opaque portion of each member covers the forward opaque portion of the succeeding member and a light-sensitive film overlying the forward opaque portion of each member except that closest to the tab and a light-sensitive film attached to the backing strip so that it lies under the rearward opaque portion of the member farthest from the tab, and having the backing strip folded so that the forward opaque portions of the focal plane shutter curtain members overlie the succeeding light sensitive films.

4. Loading material for a photographic film pack comprising, when unfolded and completely extended, an elongated backing strip having a pull-out tab formed at one end thereof, a plurality of focal plane shutter curtain members, each being apertured to effect an exposure, between a forward and a rearward opaque portion, each of said members being attached by its forward edge to the backing strip, the attachment being such that the forward end of each member is nearer to the tab end of the backing strip, the members being arranged with relation to each other so that the rearward opaque portion of each member covers the forward opaque portion of the succeeding member and a light-sensitive film overlying the forward opaque portion of each member except that closest to the tab and a light-sensitive film attached to the backing strip so that it lies under the rearward opaque portion of the member farthest from the tab, and having the backing strip folded so that the forward opaque portions of the focal plane shutter curtain members overlie the succeeding light sensitive films and having smooth transparent membranes interposed between the focal plane shutter curtain members and the succeeding light-sensitive films to prevent entanglements.

5. Loading material for a photographic film pack comprising, when unfolded and completely extended, an elongated backing strip having a pull-out tab formed at one end thereof, a plurality of focal plane shutter curtain members, each apertured to effect an exposure, between a forward and a rearward opaque portion, each of said members being attached by its forward edge to the backing strip, the attachment being such that the forward end of each member is nearer to the tab end of the backing strip, the members being arranged with relation to each other so that the rearward opaque portion of each member covers the forward opaque portion of the succeeding member and a film sensitive to a particular color of light overlying the forward opaque portion of each member except that closest to the tab and a film sensitive to a particular color of light attached to the backing strip so that it lies under the rearward opaque portion of the member farthest from the tab, and having the backing strip folded so that the forward opaque portions of the focal plane curtain shutter members overlie the succeeding light sensitive films and having smooth transparent membranes interposed between the focal plane shutter curtain members and the succeeding light-sensitive films to prevent entanglements.

6. Loading material for a photographic film pack comprising, when unfolded and completely extended, an elongated backing strip having a pull-out tab formed at one end thereof, a plurality of focal plane shutter curtain members, each being apertured to effect an exposure, between a forward and a rearward opaque portion, each of said members being attached by its forward edge to the backing strip, the attachment being such that the forward end of each member is nearer to the tab end of the backing strip, the members being arranged with relation to each other so that the rearward opaque portion of each member covers the forward opaque portion of the succeeding member and a film sensitive to a particular color of light overlying the forward opaque portion of each member except that closest to the tab and a film sensitive to a particular color of light attached to the backing strip so that it lies under the rearward opaque portion of the member farthest from the tab, and having the backing strip folded so that the forward opaque portion of the focal plane curtain shutter members overly the succeeding light-sensitive films and having smooth transparent colored membranes interposed between the focal plane shutter curtain members and the succeeding light-sensitive films to prevent entanglements and act as light filters.

RAYMOND G. BROWN.